(12) United States Patent
Arocena De La Rua et al.

(10) Patent No.: US 9,333,555 B2
(45) Date of Patent: May 10, 2016

(54) MANUFACTURING METHOD OF A COMPONENT OF A SPLIT BLADE OF A WIND TURBINE

(71) Applicant: Gamesa Innovation & Technology, S.L., Sarriguren (Navarra) (ES)

(72) Inventors: Ion Arocena De La Rua, Sarriguren (ES); Eneko Sanz Pascual, Pamplona (ES)

(73) Assignee: Gamesa Innovation & Technology, S.L., Sarriguren (Navarra) (ES)

( * ) Notice: Subject to any disclaimer, the term of this patent is extended or adjusted under 35 U.S.C. 154(b) by 253 days.

(21) Appl. No.: 13/851,483

(22) Filed: Mar. 27, 2013

(65) Prior Publication Data

US 2013/0318788 A1  Dec. 5, 2013

(30) Foreign Application Priority Data

Apr. 3, 2012 (ES) .................... 201200351

(51) Int. Cl.
| | |
|---|---|
| *B23P 15/04* | (2006.01) |
| *B21K 3/04* | (2006.01) |
| *B29C 70/86* | (2006.01) |
| *B29D 99/00* | (2010.01) |
| *F03D 1/06* | (2006.01) |

(52) U.S. Cl.
CPC . *B21K 3/04* (2013.01); *B23P 15/04* (2013.01); *B29C 70/86* (2013.01); *B29D 99/0028* (2013.01); *F03D 1/0675* (2013.01); *F05B 2230/50* (2013.01); *F05B 2230/60* (2013.01); *Y02E 10/721* (2013.01); *Y10T 29/49336* (2015.01)

(58) Field of Classification Search
CPC . F05D 2230/23; F05D 2230/51; B23P 15/04; F05B 2230/50; F05B 2230/60; B21K 3/04; B29D 99/0025; B29D 99/0028; Y10T 29/49327; Y10T 29/49336; Y10T 29/49337; Y10T 29/49826; Y10T 29/49885; Y10T 29/4997

See application file for complete search history.

(56) References Cited

U.S. PATENT DOCUMENTS

2006/0188378 A1 * 8/2006 Bech et al. ............... 416/227 R

FOREIGN PATENT DOCUMENTS

| EP | 2 138 715 A2 | 12/2009 |
|---|---|---|
| EP | 2 138 716 A1 | 12/2009 |
| WO | 2005/100781 A1 | 10/2005 |
| WO | 2006/103307 A2 | 10/2006 |

* cited by examiner

*Primary Examiner* — Christopher Besler
(74) *Attorney, Agent, or Firm* — Ladas & Parry LLP

(57) ABSTRACT

The invention provides a manufacturing method of a component of a split blade of a wind turbine (such as an inboard shell or an inboard spar) having joining elements with its complementary component (i.e. an outboard shell or an outboard spar). The method comprises the following steps: a) manufacturing a joint laminate of a composite material having embedded into it the joining elements, said joint laminate being configured for becoming a part of the component; b) manufacturing the component using as a preform said joint laminate. The invention also refers to a split blade comprising components manufactured by said manufacturing method.

13 Claims, 3 Drawing Sheets

MANUFACTURING METHOD OF A COMPONENT OF A SPLIT BLADE OF A WIND TURBINE

FIELD OF THE INVENTION

The present invention relates generally to split blades of wind turbines and more in particular to a manufacturing method of a component of a split blade of a wind turbine having joining elements with another component of the blade.

BACKGROUND

Wind turbines include a rotor that supports a number of blades extending radially therefrom for capturing the kinetic energy of the wind and causing a rotational motion of a driving train coupled to an electric generator for producing electrical power.

The amount of energy produced by wind turbines is dependent on the rotor blade sweeping surface that receives the action from the wind and consequently increasing the length of the blades normally leads to an increase of the power output of the wind turbine.

However, the size of the blades is presently limited to some extent by transportation and infrastructure requirements.

To solve the transportation problems posed particularly by lengthy blades the prior art teaches the division of the blade into two or more longitudinal sections provided with joining means, so that each section may be manufactured individually and all sections may be assembled at the wind turbine site.

WO 2005/100781, WO 2006/103307, EP 2 138 715 and EP 2 138 716 in the name of the applicant, disclose different joining elements for split blades of wind turbines.

In a typical manufacturing method of those components of the longitudinal modules of a split blade of a wind turbine having joining elements with other components these joining elements are incorporated to the components during their manufacture.

A drawback of this method is the complexity of the manufacture of the components of a split blade of a wind turbine having joining elements with other components.

SUMMARY OF THE INVENTION

It is an object of the present invention to provide a simplified manufacturing method of a component of a split blade of a wind turbine (such as an inboard shell or an inboard spar) having joining elements with its complementary component (i.e. an outboard shell or an outboard spar).

It is another object of the present invention to provide a manufacturing method of a component of a split blade of a wind turbine (such as an inboard shell or an inboard spar) having joining elements with its complementary component (i.e. an outboard shell or an outboard spar) that improves the integration of said joining elements.

These and other objects are met by a manufacturing method comprising the following steps:

a) manufacturing a joint laminate of a composite material having embedded into it the joining elements, said joint laminate being configured for becoming a part of the component;

b) manufacturing the component using as a preform said joint laminate.

Advantageously the joint laminate is manufactured in a cured state for facilitating its transportation to the plants where the split blades are manufactured.

In one embodiment the component of the split blade is manufactured in a bivalent mould, i.e. a mould adaptable to manufacture a component of a unitary blade and components of a split blade.

In another embodiment the component of the split blade is manufactured in a specific mould for it.

The method includes the manufacturing of inboard and outboard shells with joint laminates configured for becoming a longitudinal central section of the shell comprised between the 30-70% of the chord in their neighbor ends and extended in at least 20% of their length.

The method includes the manufacturing of inboard and outboard spars with joint laminates configured for becoming the cap of the spar in at least 20% of their length.

Other desirable features and advantages of the manufacturing method of a component of a split blade of a wind turbine with joining elements with other component of the split blade according to the invention will become apparent from the subsequent detailed description of the invention and the appended claims, in relation with the enclosed drawings.

DETAILED DESCRIPTION OF THE INVENTION

In the manufacturing method of a component of a split blade having joining elements with another component according to the invention, the joining elements are incorporated in a first stage into a suitable joint laminate and the component is manufactured in a second stage using as a preform said joint laminate in a cured or a partially cured state.

Figure 1:
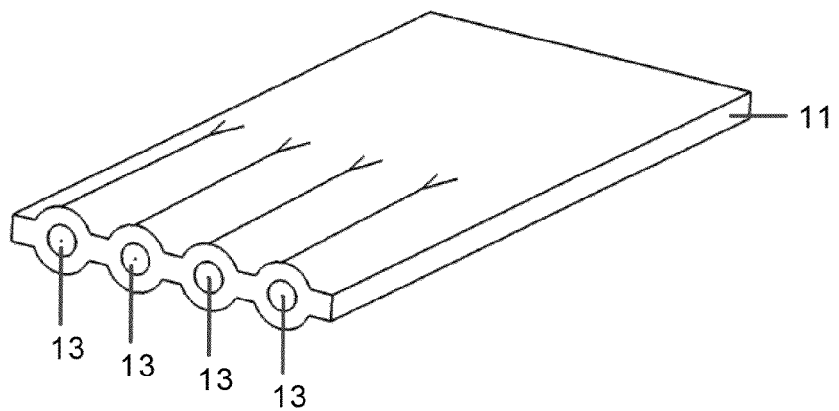
FIG. 1 is a schematic perspective view of a joint laminate for a component of a split blade according to the present invention.

FIG. 1 shows an example of a joint laminate 11 of a composite material incorporating said joining elements 13.

On the one hand, the joint laminate 11 is dependent of the features of the particular joining elements 13 being used in the blade. On the other hand, it is assumed that it is always possible to design a specific joint laminate for a particular set of joining elements 13.

Figure 2A:
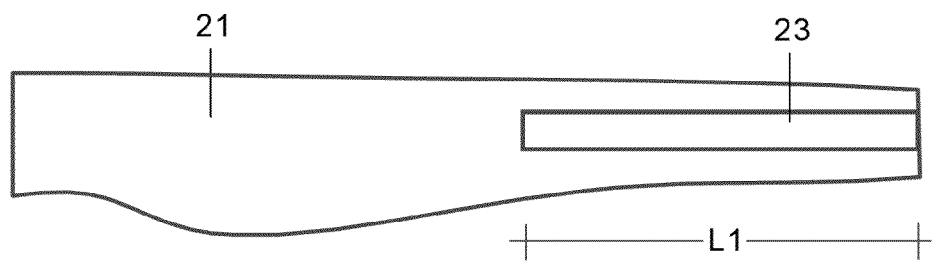
FIGS. 2a and 2b are schematic plan views of the inboard and outboard shells of a split blade of a wind turbine manufactured using joint laminates according to this invention.
Figure 2B:
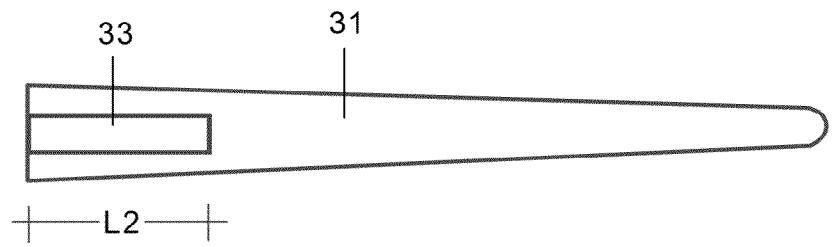

In reference to a blade configuration with structural shells, FIGS. 2a and 2b show an inboard shell 21 and an outboard shell 31 which are manufactured using, respectively, as preforms specific joint laminates 23, 33 incorporating the joining elements foreseen for both shells 21, 31.

The joining elements 13 are embedded into joint laminates 23, 33 of a composite material such as Carbon Fibre Reinforced Plastic (CFRP) or Glass Fiber Reinforced Plastic (GFRP) specifically designed on the one hand for achieving a good integration of the joining elements 13 and on the other hand for providing suitable preforms to be used in the manufacturing of the inboard shell 21 and an outboard shell 31.

The shape and structure of the joint laminates 23, 33 must be compatible with the space that they will occupy in, respectively, the inboard shell 21 and the outboard shell 31.

As shown in FIGS. 2a and 2b, these joint laminates 23, 33 may occupy a longitudinal central section of the inboard and outboard shells 21, 31 comprised between the 30%-70% of the chord in the end of each shell close to the other shell, being their respective lengths L1, L2 at least 20% of, respectively, the length of the inboard and outboard shells 21, 31. They can even have the same length than the shells 21, 31.

Figure 3A:
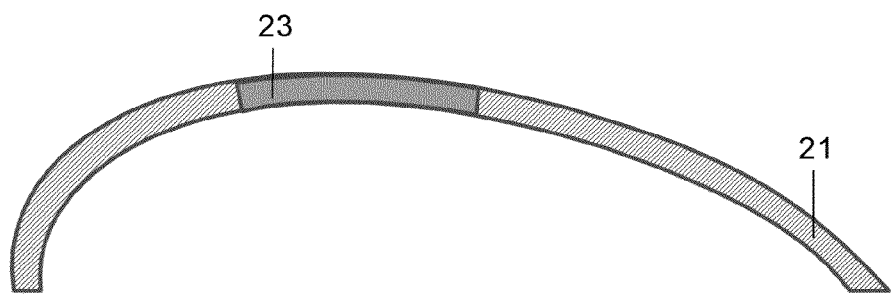
FIGS. 3a and 3b are schematic cross-sectional views of a shell of a split blade of a wind turbine manufactured using a joint laminate according to this invention.
Figure 3B:
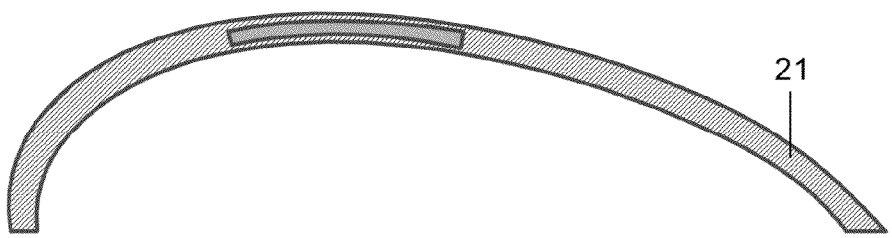

As shown in FIGS. 3a and 3b the thickness of the joint laminate 23 may be the same or lesser than the thickness of the central section of the inboard shell 21. The same is applicable to the joint laminate 33 with respect to the outboard shell 31.

Figure 4A:
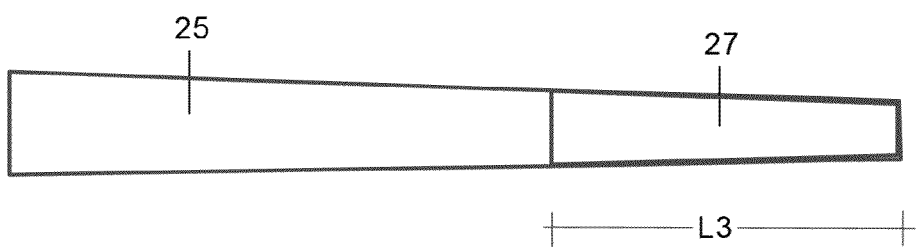
FIGS. 4a and 4b are schematic plan views of the inboard and outboard spars of a split blade of a wind turbine manufactured using joint laminates according to this invention.
Figure 4B:
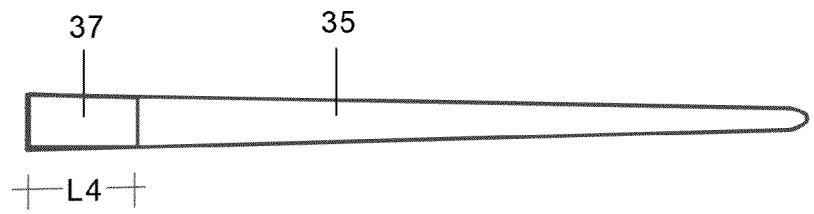

In reference to a blade configuration with internal spars, FIGS. 4a and 4b show an inboard spar 25 and an outboard spar 35 which are manufactured using, respectively, as preforms specific joint laminates 27, 37 incorporating the joining elements foreseen for both spars 25, 35.

The shape and structure of the joint laminates 27, 37 must be compatible with the space that they will occupy in, respectively, the inboard spar 25 and the outboard spar 35.

As shown in FIGS. 4a and 4b these joint laminates 27, 37 may occupy the caps of the inboard and outboard spars 25, 35, being their respective lengths L3, L4 at least 20% of the length of the inboard and outboard spars 21, 31. They can even have the same length than the spars 25, 35.

Figure 5A:
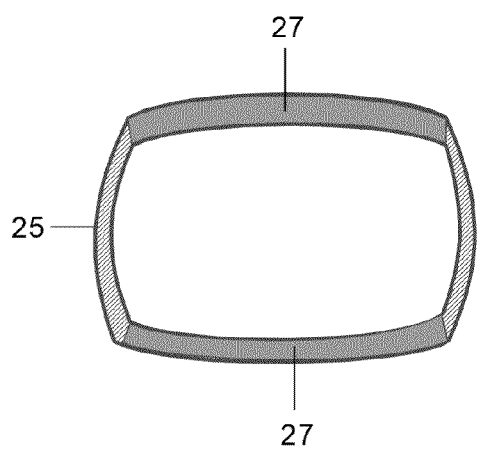
FIGS. 5a and 5b are schematic cross-sectional views of a spar of a split blade of a wind turbine manufactured using a joint laminate according to this invention.
Figure 5B:
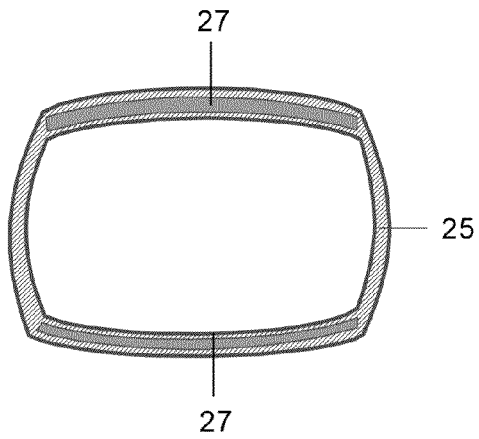

As shown in FIGS. 5a and 5b the thickness of joint laminate 27 may be the same or lesser than the thickness of the caps of the inboard spar 25. The same is applicable to the joint laminate 37 with respect to the outboard spar 35.

Figure 6:
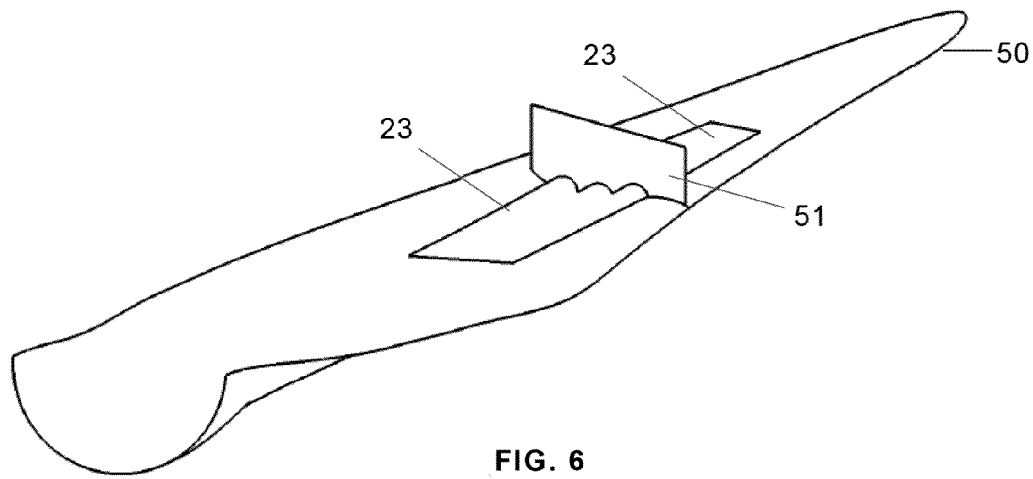
FIG. 6 is a schematic perspective view of a mould for manufacturing a shell of a split blade of a wind turbine with the joint laminates of its two components placed in position.
Figure 7A:
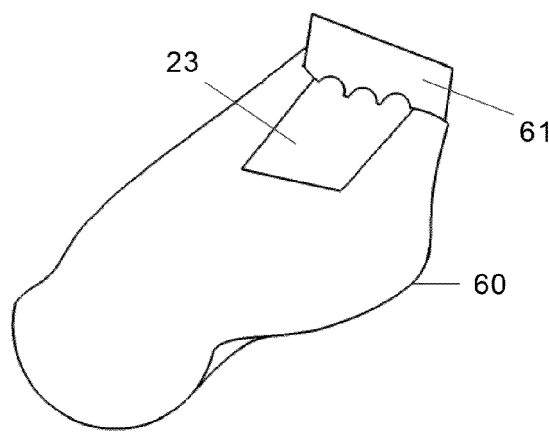
FIGS. 7a and 7b are schematic perspective views of two moulds for separately manufacturing the inboard and outboard shells of a split blade of a wind turbine with the joint laminates placed in position.
Figure 7B:
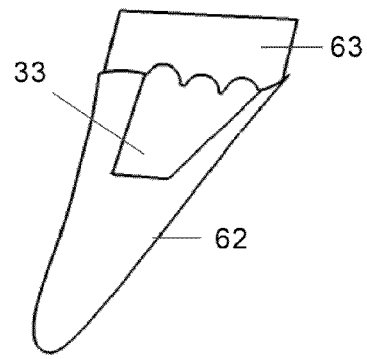

The manufacturing of any of the above-mentioned components of a split blade of a wind turbine with a joint laminate manufactured in a previous stage can be made using a suitable mould for the whole component of the blade as shown in FIG. 6 (a mould that can also be used for manufacturing a component of a non-split blade) or two suitable moulds for both components of the blade as shown in FIGS. 7a and 7b.

In the first case, as illustrated in FIG. 6, the joint laminates 23, 33 incorporating the joining elements manufactured previously are placed on the mould 50 at their corresponding positions, separated by a separating template 51. Then the manufacture of the inboard and outboard shells 21, 31 will be completed using any of the known manufacturing methods for wind turbine blades. The inboard shell 21 and the outboard shell 31 can be manufactured at the same time.

In the second case, as illustrated in FIGS. 7a, 7b, the joint laminates 23, 33 incorporating the joining elements manufactured previously are placed on the moulds 60, 62 at their corresponding positions delimited by the templates 61, 63. Then the manufacture of the inboard and outboard shells 21, 31 will be completed using any of the known manufacturing methods of wind turbine blades.

The main advantage of the present invention is that it allows a centralised manufacturing of the joint laminates, which is desirable for assuring the highest quality control level for a part of the blade with a special structural importance and the decentralised manufacturing of the components of the split blade, which is desirable for reducing costs.

Although the present invention has been described in connection with various embodiments, it will be appreciated from the specification that various combinations of elements, variations or improvements therein may be made, and are within the scope of the invention.

The invention claimed is:

1. A method for manufacturing components of a split blade of a wind turbine that comprises a plurality of longitudinal modules that are manufactured separately and are then joinable to form the wind turbine blade, wherein a first of the plurality of longitudinal modules includes a first longitudinal component comprising a first joint laminate preform and first joinder elements, and a second of the plurality of longitudinal modules includes a second longitudinal component comprising a second joint laminate preform and second joinder elements, wherein the respective first and second joinder elements are complementary to each other so that they can facilitate joinder of the first and second components; the method comprising (1)(a) manufacturing the first joint laminate preform, the first joint laminate preform comprising a material having the first joinder elements embedded in the material, the first joint laminate preform being configured for integration into the first component with the first joinder elements disposed at a predetermined position at an end of the first component to facilitate joinder between the first component and the second component;

(1)(b) disposing the first joint laminate preform in a mold or a section thereof; and (1)(c) then manufacturing the first component using the mold with integration of the first joint laminate preform into the first component such that it becomes a part of the first component and such that the first joinder elements are disposed at the predetermined position at the end of the first component;

(2)(a) manufacturing the second joint laminate preform, the second joint laminate preform comprising a second material having the second joinder elements embedded therein, the second joint laminate preform being configured for integration into the second component with the second joinder elements disposed at a predetermined position at an end of the second component to facilitate joinder between the second component and the first component;

(2)(b) disposing the second joint laminate preform in another section of the mold or in a second mold; and (2)(c) manufacturing the second component using the mold or second mold with integration of the second joint laminate preform into the second component such that it becomes part of the second component and such that the second joinder elements are disposed at the predetermined position at the end of the second component;

wherein the respective first and second joint laminate preforms are disposed at respective ends of the first and second components such that the respective first and second joinder elements are in position to facilitate joinder of the first and second components when the end of the first component is in contact lengthwise with the end of the second component.

2. The method according to claim 1, wherein in step (1)(a) the first joint laminate preform is manufactured in a cured state.

3. The method according to claim 1, wherein in step (1)(a) the first joint laminate preform is manufactured in a partially cured state.

4. The method according to claim 1, wherein the mold is adaptable for molding either a unitary blade or the first and second longitudinal components of the split blade.

5. The method according to claim 1, wherein the mold comprises a separating template that separates a first section of the mold from a second section of the mold, and step (1)(c) comprises manufacturing the first component in the first section of the mold and step (2)(c) comprises manufacturing the second component in the second section of the mold at the same time.

6. The method according to claim 1, wherein the mold comprises a plurality of sections and step (1)(c) comprises manufacturing the first component in only one of the plurality of sections.

7. The method according to claim 1, wherein the mold is configured to form the first component only.

8. The method according to claim 1, wherein the first component is a shell of the wind turbine blade.

9. The method according to claim 8, wherein said first joint laminate preform is configured to be integrated in the first component as a longitudinal central section of the shell.

10. The method according to claim 9, wherein said first joint laminate preform is configured to be integrated in the first component along an entire length of the shell.

11. The method according to claim 1, wherein the first component is a spar of the wind turbine blade.

12. The method according to claim 11, wherein said first joint laminate preform is configured to be integrated in the first component as a cap of the spar.

13. The method according to claim 12, wherein said first joint laminate is configured to be integrated in the first component along an entire length of the spar.

* * * * *